US006983670B2

(12) United States Patent
Kor

(10) Patent No.: US 6,983,670 B2
(45) Date of Patent: Jan. 10, 2006

(54) PINION GEAR TYPE ROTATING DEVICE

(75) Inventor: Choy-Yim Kor, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 298 days.

(21) Appl. No.: 10/393,335

(22) Filed: Mar. 18, 2003

(65) Prior Publication Data

US 2003/0188597 A1    Oct. 9, 2003

(30) Foreign Application Priority Data

Apr. 9, 2002    (SG)    ................................ 200202080

(51) Int. Cl.
*G05G 11/00* (2006.01)
(52) U.S. Cl. ................................ 74/490.08; 74/490.07
(58) Field of Classification Search ............. 74/490.01, 74/490.08, 490.09, 490.07, 479.01
See application file for complete search history.

(56) References Cited

U.S. PATENT DOCUMENTS

| | | | | |
|---|---|---|---|---|
| 3,665,805 A | * | 5/1972 | Wolf | ............................ 409/190 |
| 3,852,611 A | * | 12/1974 | Cesar | ........................... 378/27 |
| 3,924,432 A | * | 12/1975 | Yarnold | ........................ 72/123 |
| 5,036,723 A | * | 8/1991 | Matsumoto | .............. 74/490.08 |
| 5,234,304 A | * | 8/1993 | Okumoto et al. | ....... 414/223.01 |
| 5,323,712 A | * | 6/1994 | Kikuiri | .......................... 108/20 |
| 5,417,542 A | * | 5/1995 | Suzuki et al. | ............. 198/475.1 |
| 5,481,936 A | * | 1/1996 | Yanagisawa | .............. 74/490.08 |

FOREIGN PATENT DOCUMENTS

JP    63-216663    *    9/1988

* cited by examiner

*Primary Examiner*—David Fenstermacher

(57) ABSTRACT

A pinion gear type rotating device, in particular, is used in electromagnetic interference characterization of a fiber optics transceiver, by which a member, such as a fiber optics transceiver can be held and rotated by at least 360 degrees about x, y and z axes. The device comprising a first support structure for being rotated about the first axis, a first shaft which extends along said first axis and to which a second support structure is connected via a first pinion gear train 140 for being rotated about the second axis extending across the first axis, the second support structure and first pinion gear train 140 being arranged on the first support structure for being rotated therewith, and second shaft which extends along the said first axis and to which a third support structure on which the member is to be arranged, is connected via second and third pinion gear trains 150, 160 for being rotated about the third axis extending across the second axis, the third support structure and the third pinion gear train 160 being arranged on the second support structure for being rotated therewith, and the second pinion gear train 150 being arranged on the first support structure for being rotated therewith and for transferring a rotation of the second shaft to a rotation about the second axis.

12 Claims, 4 Drawing Sheets

PINION GEAR TYPE ROTATING DEVICE

BACKGROUND OF THE INVENTION

This invention relates to a pinion gear type rotating device, especially for use in electromagnetic interference characterization of a fiber optics transceiver, by which device a member such as a fiber optics transceiver can be held and rotated by at least 360 degrees about first, second and third axes extending across to each other. The invention further relates to a device for characterizing electromagnetic interference of a fiber optics transceiver and to methods for operating a pinion gear type rotating device according to the invention.

A fiber optics transceiver generates noise in a form of electromagnetic radiation when optical signal is transmitted through the transceiver. Electromagnetic interference (EMI) characterization is performed to detect level of such electromagnetic radiation from the transceiver from all possible directions.

EMI characterization is normally done inside an enclosed chamber. The transceiver is rotated 360 degrees in all directions by an engineer holding the said transceiver in his hands. The said method is highly inaccurate and tedious and a door of the chamber has to be left open for the hands to hold the transceiver, resulting to further inaccurate characterization results.

The door should be closed for EMI characterization of the fiber optics transceiver to be accurate. A turntable method is used where the fiber optics transceiver to be EMI characterized is placed on the turntable which rotates about a single axis. Although the EMI characterization can now be done with the door closed, the fiber optics transceiver is not able to be rotated in 360 degrees in all directions.

A belt driven manipulator is an improved version of both the hand method and turntable method described above. The said characterization can also be done with the chamber door closed and rotation of the fiber optics transceiver in all directions is achieved by rotating three wheels outside the chamber, which are connected to the belt driven manipulator in the chamber. However, slipping of the belt can occur during operation, resulting the fiber optics transceiver to be in an undefined position in the chamber. The characterization results hence become unreliable.

SUMMARY OF THE INVENTION

Accordingly, it is an object of the present invention to provide a rotating device, especially for use in an electromagnetic interference characterization of a fiber optics transceiver, which is capable to provide in a simple and reliable manner rotation about first, second and third axes, especially by at least 360 degrees.

It is a further object of the invention to provide a method for operating the device according to the invention in a suitable manner.

It is a further object of the invention to provide a device for characterizing electromagnetic interference of a fiber optics transceiver, which device is reliable so that good results can be obtained therewith.

In accordance with the invention a pinion gear type rotating device is provided, especially for use in electromagnetic interference characterization of fiber optics transceiver, for rotating a member about first, second and third axes, especially by at least 360 degrees per axis, the second axis extending across the first axis and the third axis extending across the second axis, the device comprising a first support structure which can be rotated about the first axis, a first shaft which extends along the first axis and to which a second support structure is connected via a first pinion gear train for rotating the said second support structure about the second axis, the second support structure and the first pinion gear train being arranged on the first support structure for being rotated therewith, and a second shaft which extends along the first axis and to which a third support structure for holding the member is connected via second and third pinion gear trains for rotating the second support structure about the third axis, the third support structure and the third pinion gear train being arranged on the second support structure for being rotated therewith, and the second pinion gear train being arranged on the first support structure for being rotated therewith, wherein the second pinion gear train is provided for transferring the rotation direction about the first axis to a rotation direction about the second axis and the third pinion gear train being provided for transferring rotation direction about the second axis to a rotation direction about the third axis.

By using a pinion gear type device, a high accuracy in positioning the member attached to the third support structure can be achieved. The interaction between the pinions is important and therefore, the first and second shafts are arranged at the rotational center of the first support structure thereby ensuring that the first and second gear trains are always in contact with the corresponding first and second shafts during the rotation of the first support structure. Thereby the function of the whole device can be maintained at any position of the first support structure, thereby leading to a reliable device.

The same applies for the connection between the second and the third gear trains. In this respect, since the second gear train transfers the rotation direction of the second drive shaft (rotation about the first axis) into a rotation about the second axis, the third gear train can be connected to the second gear train in a position around this second axis, thereby preventing the third gear train from moving away from the last pinion of the second gear train, thereby always maintaining a complete overall gear train from the second shaft to the third support structure to be rotated thereby.

Especially, the second axis extends perpendicularly to the first axis, and the third axis extends perpendicularly to the second axis. In general, the first, second and third axes extend in angle with respect to each other, wherein the three axes have always one point of intersection.

The first support structure may be rotated via any motor drive, such as a servomotor having an output pinion engaged with a toothbar circularly extending around the first axis, thereby allowing continuously driving of the first support structure in any rotational direction around the first axis.

According to a preferred embodiment of the invention, the device comprises a third shaft which extends along the first axis and which is connected to the first support structure for rotating the same. The connection between the first support structure and the third shaft is preferably a direct connection. Accordingly, the first, second and third shafts are arranged concentrically to each other. This arrangement of the three concentric shafts in one axis, i.e. the first axis, allows the driving apparatus to be arranged outside of a chamber, and the rotating device is controlled by the three shafts extending outside thereof. Thereby, it is possible to provide for a small through hole in a chamber which is nearly filled by the three shafts, thereby providing for a nearly completely closed chamber.

The arrangement of the three concentric shafts can be made in any suitable manner, preferably the innermost shaft controls the rotation of the first gear train and, thus, the rotation of the second support structure, the middle shaft controls the rotation of the second and the following third gear trains and, thus, the rotation of the third support structure about the third axis, and the outermost shaft controls the rotation of the first support structure about the first axis. In using the three concentrically arranged shafts, the outermost and the middle shaft are hollow and the innermost shaft may be a solid body.

The first and the second shafts and, if foreseen, the third shaft can be connected to corresponding servomotors via corresponding sprockets and chains installed in a distance from the first support structure along the first axis. The rotations of the said shafts and hence the rotation of the corresponding support structures and hence of the member, such as the fiber optics transceiver, are automated and controlled by the servomotor which itself maybe controlled by a computer device. The position of the member in the rotating device can hence be defined accurately. The EMI characterization data of the fiber optics transceiver can then be recorded for every incremental rotation in the gear device and subsequently printed out for analysis.

According to the invention, the rotation of the first shaft about the first axis is transferred via the first gear train into a rotation about the second axis extending across the first axis, and the rotation of the second shaft is transferred by the second gear train into a rotation about this second axis and then by the following third gear train into a rotation about the third axis extending across the second axis. These transfers of rotation can be achieved for example via a respective set of two helical gears interacting with each other. A cheaper, and also accurate solution consists in that the first, second and a third pinion gear trains respectively each comprise a set of two conical gears interacting with each other. This last embodiment is a preferable solution.

The respective support structures may comprise platforms in the shape of a block having a flat supporting surface. Preferably the platform is formed as a plate, in particular as a circular disc.

In order to achieve a very compact device, which is preferable considering the use thereof in a chamber, the second support structure comprises an U-shaped mounting bracket. The mounting bracket has two U-legs and a base extending between the two U-legs and connecting the same. This U-shaped mounting bracket has the advantage, that the third support structure, for example the platform, can be arranged in a place saving manner between the two U-legs, which simultaneously preferably act as receiving elements for receiving on the one hand a driving shaft of the first gear train, the driving shaft extending in the second axis, and on the other hand a bearing shaft bearing the U-bracket and simultaneously used for bearing pinions of the second gear train and allowing rotation about the second axis on the other side of the U-shaped bracket.

When rotating the first support structure, the first gear train is influenced in a manner that the second support structure connected thereto is also rotated, so that a corresponding compensation rotation is necessary, in case the member arranged on the third support structure should only be rotated about the first axis. Simultaneously, rotating the first support structure also influences the second and, thus, the third gear trains in a manner rotating the third support structure. However, since the rotation of the second support structure achieved via influence on the first gear train provides for a counter-rotation of the third support structure via counterinfluence on the third gear train, the rotation of the third support structure is compensated. Nevertheless, the compensation rotation of the first shaft for compensating the undesired rotation of the second support structure influences once more the third gear train arranged on the second support structure, thereby making it necessary to also compensate a final rotation of the third support structure via rotating the second shaft and thereby the second and third gear trains.

In order to facilitate the compensation of the rotations influenced by rotating the first platform or the second support structure, the gear ratio of the first, second and third pinion gear trains are preferably equal, making it possible to chose the same compensation angles for the shafts, i.e. the compensation angles are similar to the initial rotation of the first support structure or of the initial rotation of the second support structure.

Furthermore, the invention provides for a device for determining electromagnetic interference of a fiber optics transceiver, the device comprising an electromagnetic test chamber and a pinion gear type rotating device as described above, wherein the pinion gear type rotating device being arranged within the electromagnetic test chamber with the three concentric shafts for controlling the support structures extending outside thereof via a through opening in the chamber for being connected to corresponding motor drives for separately driving the shaft.

The device according to the invention allows an accurate and reliable EMI characterization of fiber optics transceivers.

According to a method for operating a pinion gear type rotating device having the above-described features according to the invention, the following steps are carried out: rotating the first support structure by an angle of $+\alpha$ or $-\alpha$, rotating the first shaft by an angle of $+\beta$ or $-\beta$, respectively, in order to compensate rotation of the second support structure resulting from the rotation of a first support structure, and rotating the second shaft about an angle of $+\gamma$ or $-\gamma$, respectively, in order to compensate the rotation of the third support structure resulting from rotation of the first shaft, thereby rotating the third support structure by the angle $\alpha$ about the first axis only, and/or rotating the first shaft by an angle of $+\beta$ or $-\beta$ and rotating the second shaft about an angle of $+\gamma$ or $-\gamma$, respectively, in order to compensate rotation of the third support structure resulting from the rotation of the second support structure, thereby rotating the third support structure by the angle $\beta$ about the second axis only, and/or rotating the second shaft by an angle of $+\gamma$ or $-\gamma$, thereby rotating the third support structure by the angle $\gamma$ about the third axis only.

The method according to the invention provides for a reliable and simple process for accurately positioning a member, in particular a fiber optics transceiver within a test chamber.

In case the gear ratio of the first, second and third pinion gear trains are equal, a method for operating a pinion gear type rotating device according to the invention comprises the following steps: rotating the first support structure by an angle of $+\alpha$ or $-\alpha$, rotating the first shaft by the angle of $+\alpha$ or $-\alpha$, respectively, in order to compensate rotation of the second support structure resulting from rotation of the first support structure, and rotating the second shaft by the angle of $+\alpha$ or $-\alpha$, respectively, in order to compensate the rotation of the third support structure resulting from rotation of the first shaft, thereby rotating the third support structure by the angle $\alpha$ about the first axis only, and/or rotating the first shaft by an angle of $+\beta$ or $-\beta$ and rotating the third shaft by an angle of $+\beta$ or $-\beta$, respectively, in order to compensate rotation of the third support structure resulting from the rotation of the second support structure, thereby rotating the third support structure by the angle β about the second axis only, and/or rotating the second shaft by an angle of +γ or −γ, thereby rotating the third support structure by the angle γ about the third axis only.

The chamber for which EMI characterization of fiber optics transceiver is to be done imposes a size constrain on the design of the gear manipulator, that is the gear device according to the invention. According to the preferred embodiment of the invention, the pinion gear device is designed to be used in a GTEM chamber model 5305. The size, seen in the longitudinal direction of the shafts (corresponds to direction of first axis), of the gear device is designed to be within 470 mm (starting from the first support structure up to third support structure), and the two or three concentrically arranged shafts for controlling the rotation of the fiber optics transceiver in the gear device are to be done externally through a hole with a diameter of 62 mm at a base of this said chamber. Any motors or actuators are only to be used outside the chamber as they will interfere with the EMI characterization process.

The invention maybe implemented together with a computer containing a program element for controlling the motor drives, such as servo motors, connected to the gear device.

DETAILED DESCRIPTION OF A PREFERRED EMBODIMENT OF THE INVENTION

A preferred embodiment of the invention will now be described in details with reference to FIG. 1 to FIG. 4.

The pinion gear type rotating device is to be used for the Electromagnetic Interference (EMI) characterization of a fiber optics transceiver in a GTEM chamber model 5305, according to the preferred embodiment of the invention.

All the parts of the device are preferably to be made from plastic, in particular Pomalux and Ferrozell AS Laminates, so as not to interference with the characterization results of the fiber optics transceiver.

Figure 1:
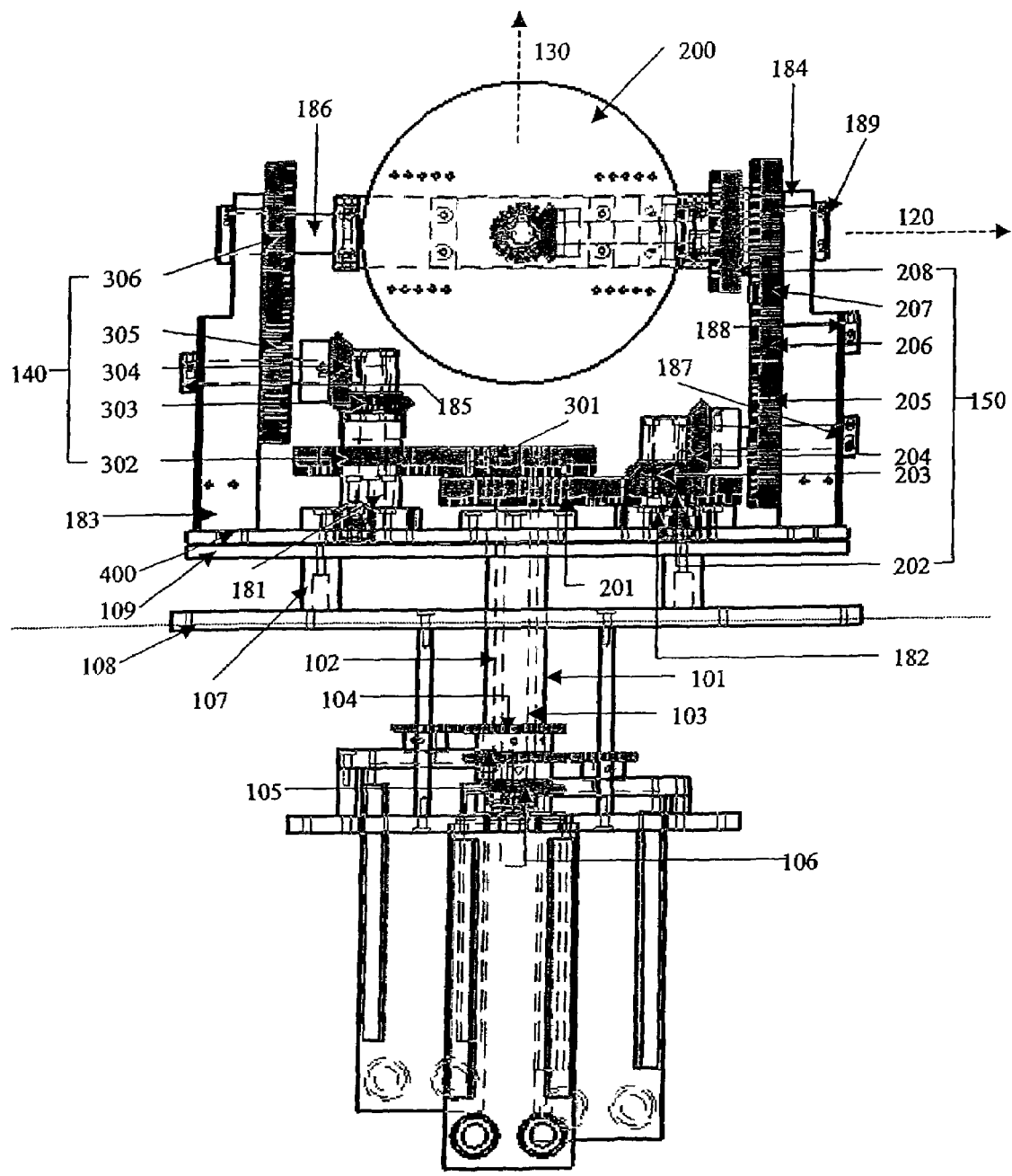
FIG. 1 shows the front view of the pinion gear type rotating device.

FIG. 1 shows a pinion gear type rotating device according to the preferred embodiment of the invention, comprising Three vertically extending concentric shafts 101, 102, 103 for controlling corresponding support structures 200, 307, 400.

A first support structure being a circular plate 400 for being rotated about a vertically extending first axis 130 controlled directly by the rotation of the outermost hollow concentric shaft 101.

A second support structure being a U-shaped mounting bracket 307 for being rotated about a second axis 120 controlled by the rotation of the innermost shaft 103 via a first pinion gear train 140, wherein the U-shaped mounting bracket 307 and the first pinion gear train 140 being arranged on the plate 400 for being rotated therewith.

A third support structure being a platform 200 for being rotated about the third axis 110 controlled by the rotation of the middle hollow concentric shaft 102 via second pinion gear train 150 and third pinion gear trains 160, wherein the platform 200 and the third pinion gear train 160 being arranged on the U-shaped mounting bracket 307 and the second pinion gear train 150 being arranged on the plate 400.

Figure 2:
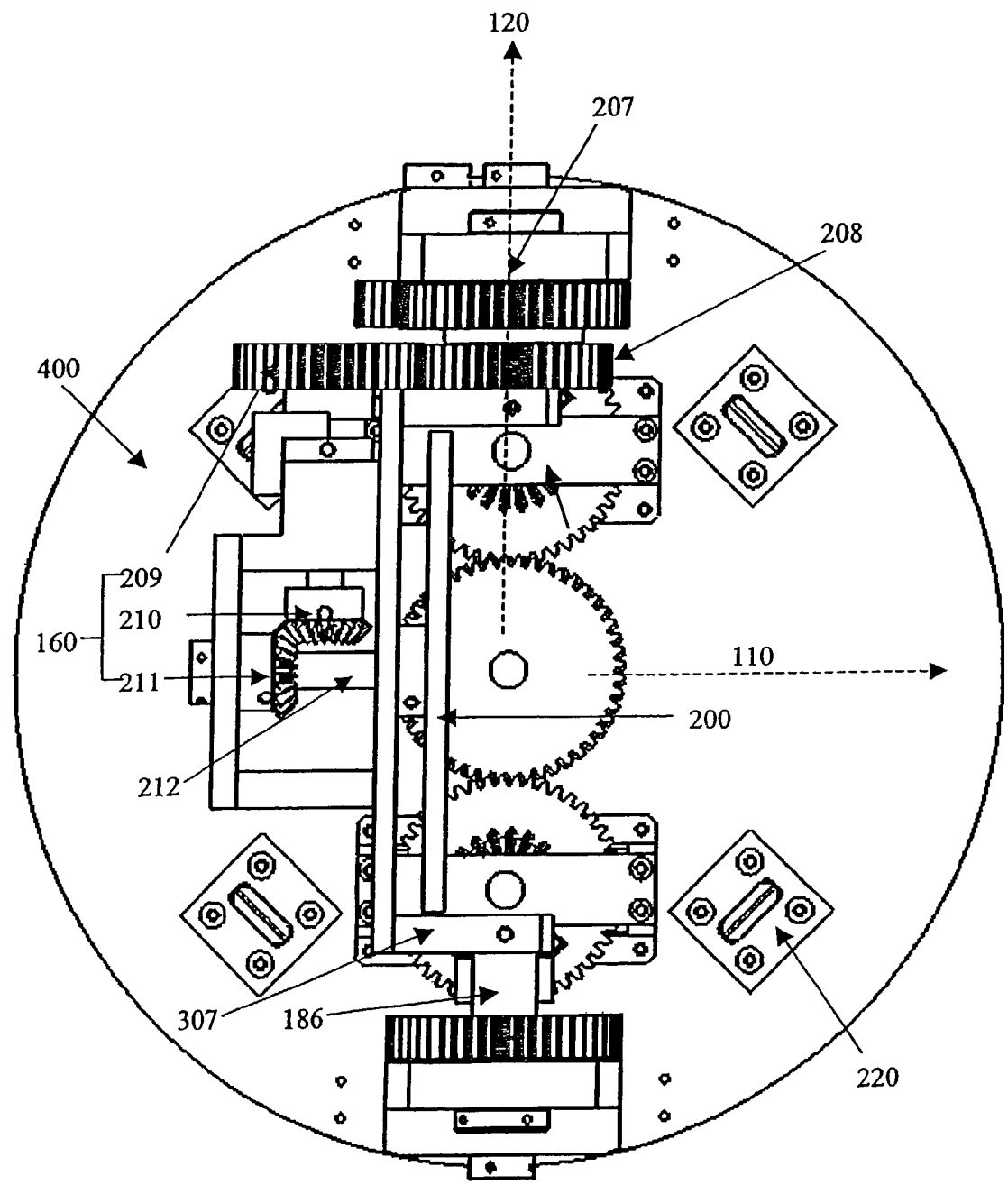
FIG. 2 shows the plan view of the pinion gear type rotating device.

The pinion gear type rotating device has a pinion gear 201 fixed to the top of the middle shaft 102 and another pinion gear 301 fixed to the top of the innermost shaft 103, to be rotated together with the rotation of the respective shafts 102, 103. The plate 400 is directly fixed to the outermost shaft 101, and is supported by another plate directly beneath the plate 400. Four rollers, as shown in FIG. 2, are attached through the plate 400, allowing the plate 400 to rotate about the first axis with respect to the supporting plate beneath.

There are two vertical shafts 181, 182 mounted on the plate 400 at the sides from the center of the plate 400. A pinion gear 302 and a conical gear 303 of the first gear train 140 are mounted on the left shaft 181, having the center of the gears 302, 303 fixed to the left shaft 181. Similarly, a pinion gear 202 and a conical gear 203 of the second gear train 150 are mounted on the right shaft 182, having the center of the gears 202, 203 fixed to the right shaft 182. The two shafts 181, 182 can be rotated with respect to the plate 400, and the gears 202, 203, 302, 303 fixed to them are rotated together with the shafts 181, 182.

There are two mounting structures 183, 184 mounted on the plate 400 at the extreme left and right ends of the plate 400. Two horizontal shafts 185, 186 are attached to the left mounting structure 185 and three horizontal shafts 187, 188, 189 are attached to the right mounting structure 184. A pinion gear 305 and a conical gear 304 are mounted to lower horizontal shaft 185 of the left mounting structure 183, having the center of the gears 304, 305 fixed to the horizontal shaft 185 and are rotated together with the shaft 185. A pinion gear 306 is fixed to the higher horizontal shaft 186 of the left mounting structure 183, having the center of the gear 306 fixed to the shaft 186 and rotated together with the shaft 186. The other end of this shaft 186 is fixed to the U-shaped mounting bracket 307 which is rotated together with shaft 186.

A pinion gear 205 and a conical gear 204 are fixed to the lowest horizontal shaft 187 of the right mounting structure 184, having the center of the gears 204, 205 fixed to the horizontal shaft 187 and is rotated together with the shaft 187. The middle horizontal shaft 188 of the right mounting structure 184 is fixed to the center of a pinion gear 206. The highest horizontal shaft 189 at the right mounting structure 184 comprises an outer hollow shaft where the pinion gears 207, 208 are fixed to it, and an inner shaft which is fixed to one of the U-leg of the U-shaped mounting bracket 307 and is rotated together with the U-shaped mounting bracket 307 with respect to the pinion gears 207, 208. The shafts 186, 189, to which the U-shaped mounting bracket is fixedly connected, extend along the second axis 120 and are born within the corresponding mounting structures 183 and 184, respectively, thereby allowing the U-shaped mounting bracket 307 to rotate about the second axis.

The U-shaped mounting bracket 307 comprises two U-legs and a base connecting the two U-legs. The two U-legs of the U-shaped mounting bracket 307 are mounted to the two mounting structures. The gears 209, 210, 211 and the platform 200 are mounted onto the base of the U-shaped mounting bracket 307. A shaft 212 which is fixed to the center of the conical gear 211 extends through the base of the U-shaped mounting bracket 307 and is fixed to the platform 200 at the other side of the base of the U-shaped mounting bracket 307, so that the platform 200 can be rotated with respect to the U-shaped bracket 307 together with the shaft 212 and the conical gear 210.

A chamber plate 108, which forms the base of the GTEM chamber, has a hole at the centre for accommodating the three vertically extending concentric shafts 101, 102, 103. The parts of the device according to the invention that are on the chamber plate 108 are to be arranged inside the GTEM chamber. A supporting plate 109 is supported on the chamber plate 108 by three supporting pillars 107. Alternatively, more than three supporting pillars 107 may be used. Three bore holes (not shown) on the chamber plate 108 are also provided to locate the support pillars 107. The supporting plate 109 has a hole at the centre for accommodating the three vertically extending concentric shafts 101, 102, 103. The plate 400 is in turn supported on the supporting plate 109 by four rollers 220 (shown in FIG. 2), which rollers also allow the plate 400 to rotate freely on the supporting plate 109, about the first axis 130.

At the lower end of the three vertical concentric shafts 101, 102, 103 are three sprockets 104, 105, 106 arranged along the first axis 103, fixed to the corresponding three concentric shafts 101, 102, 103, with a sprocket 106 fixed to the innermost shaft 103 at the lowest, another sprocket 105 fixed to the middle shaft 102 above the lowest sprocket 106, and the third sprocket 104 fixed to the outermost shaft 101 above the two sprockets 105, 106 of the innermost and middle shafts 102, 103. Servomotors are arranged beside each sprocket 104, 105, 106 at the same level and chains are used to connect each sprocket 104, 105, 106 to the corresponding servomotor to drive the sprocket 104, 105, 106 and hence the shafts 101, 102, 103. All the chains are not shown in order not to obscure aspects of the invention.

The first pinion gear train 140 comprises of pinion gears 302, 305, 306 and the pair of conical gears 303, 304 responsible for transferring the rotation of the innermost shaft 103 about the first axis 130 to a rotation about an axis parallel to the second axis shaft 186.

The second pinion gear train 150 comprises pinion gears 202, 205, 206, 207, 208 and the pair of conical gears 203, 204 responsible for transferring the rotation of the middle shaft 102 about the first axis 130 to a rotation about an axis parallel to the second axis 120.

The third pinion gear train 160 as shown in FIG. 2 comprises pinion gear 209 and the pair of conical gears 210, 211 responsible for transferring the rotation of the last pinion gear 208 of the second pinion gear train to the rotation of the platform 200 about the third axis 110.

The pinion gear type device is designed to have a height not greater than 470 mm (starting from the platform 400 up to the highest position of the platform 200) so as to be fitted into the GTEM chamber model 5305, and the 3 concentric shafts 101, 102, 103 are to be connected externally through a hole of diameter 62 mm at the base of the said chamber.

According to another embodiment of the invention, the pinion gear type device may be used in another type of chamber and the size of the device may be limited to the other type of chamber to be used in.

A piece of fiber optics transceiver to be EMI characterized is attached to the center of the platform 200. The rotation of the fiber optics transceiver in all directions is achieved by the different combination of the rotational angle of the platform 200, the U-shaped mounting bracket 307 and the plate 400.

The gear ratio of pinion gear 201 to first gear 202 of the second gear train 150, pinion gear 202 to the first gear 302 of the first gear train 140, the first, second, third pinion gear trains 140, 150, 160 are equal, especially equal to 1. For example, ignoring the direction of rotation, rotating the middle shaft 102 by an angle of α will cause a corresponding rotation of the pinion gear 201 by angle α, and hence a corresponding rotation of the first gear 202 of the second gear train 150 by angle α, and hence a corresponding rotation of the first pinion gear 209 of the third gear train 160, resulting in a rotation of the platform 200 by angle α attached to the last gear 211 of the third gear train 160 via the shaft 212.

The operation of the pinion gear device will now be described in details.

Figure 3:
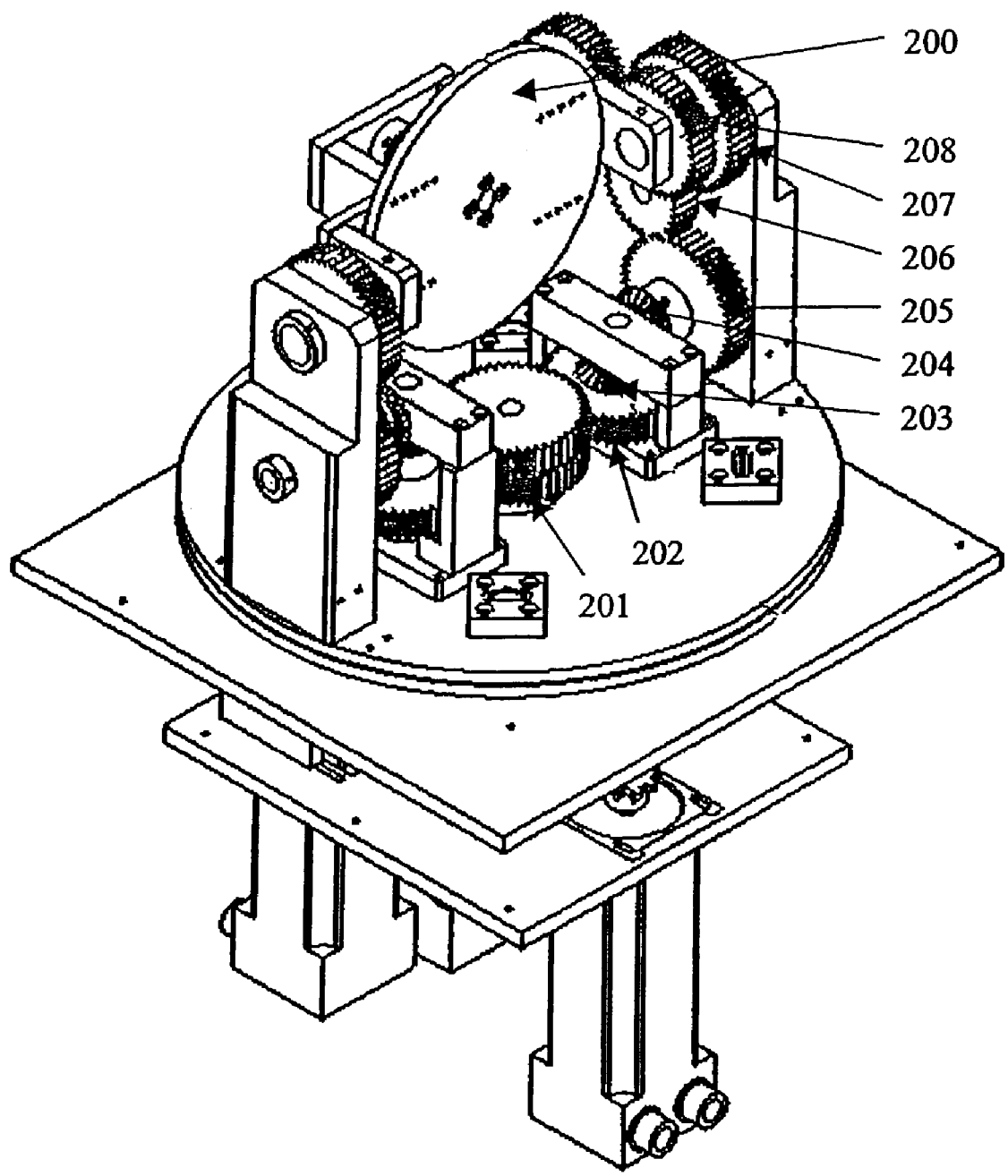
FIG. 3 is a 3-D representation of the pinion gear type rotating device, showing the set of pinion gear trains responsible for rotating the disc along the third axis.

To rotate the fiber optics transceiver, which is attached to the platform 200, by an angle of +α about the third axis 110, the platform 200 needs to be rotated by the same angle +α. The rotation of the platform 200 is indirectly controlled by rotating the middle shaft 102. To accomplish this, the middle shaft 102 is rotated by an angle +α about the first axis 130. The first pinion gear 201 as shown in FIG. 3 being connected directly to the middle shaft 102 is rotated by the same angle +α about the first axis 130. The second pinion gear 202 is meshed with the first pinion gear 201 and is rotated by an angle of −α in a direction parallel to the first axis 130. The first conical gear 203 is attached directly on top of the second pinion gear 202 and is therefore rotated in the same angle −α and direction. This first conical gear 203 is meshed with the second conical gear 204, transferring the direction of rotation into a direction parallel to the second axis 120 by the angle −α. The third pinion gear 205 is attached directly to the back of the second conical gear 204 and is hence rotated together with the second conical gear 204 in the same direction by an angle of −α. The fourth pinion gear 206 is meshed with the third pinion gear 205 and is rotated by an angle +α in a direction parallel to the second axis 120. The fifth pinion gear 207 is meshed with the fourth pinion gear 206 and is rotated by an angle −α about the second axis 120. The sixth pinion gear 208, which is also the last pinion gear of the second gear train 150, is directly attached to the fifth pinion gear 207 and is therefore rotated together with the fifth pinion gear 207 by the same angle of −α about the second axis 120.

The seventh pinion gear 209, as shown in FIG. 2, which is the first pinion gear of the third gear train 160, is meshed with the sixth pinion gear 208 and is therefore rotated by an angle of +α in a direction parallel to the second axis 120. The third conical gear 210 is directly attached to the seventh pinion gear 209 and is rotated by the same angle +α in the same direction of the seventh pinion gear 209 via a shaft, parallel to the second axis 120. This third conical gear 210 is meshed with the fourth conical gear 211, transferring the direction of rotation into the direction about the third axis 110, by the angle +α.

The shaft 212 is directly attached to the fourth conical gear 211 on one end and to the platform 200 on the other end, and is rotated by an angle +α in the third axis 110 as a result of the rotation of the fourth conical gear 211. Therefore, the platform 200, together with the fiber optics transceiver attached at its center, is rotated by the angle +α about the third axis 110 by the shaft 212.

Figure 4:
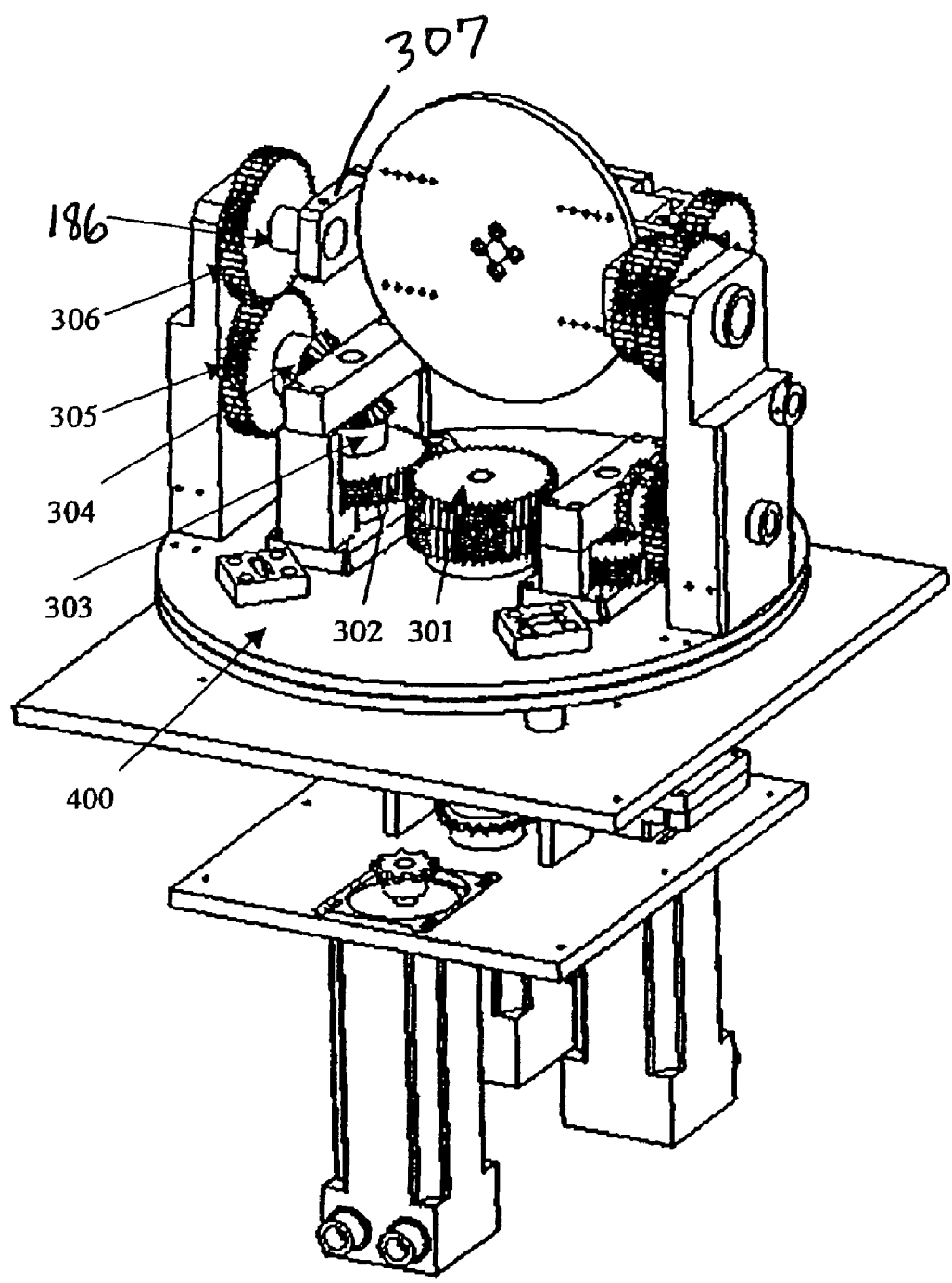
FIG. 4 is a 3-D representation of the pinion gear type rotating device, showing the set of pinion gear train responsible for rotating the shaft along the second axis.

To rotate the fiber optics transceiver, which is attached to the platform 200, by an angle of +β about the second axis 120, the U-shaped mounting bracket 307 needs to be rotated by the angle +β. The rotation of the U-shaped mounting bracket 307 is indirectly controlled by rotating the innermost shaft 103 shown in FIG. 1. To accomplish this, the innermost shaft 103 is rotated by an angle −β about the first axis 130. The eighth pinion gear 301 as shown in FIG. 4 being connected directly to the innermost shaft 103 is rotated by the same angle −β about the first axis 130. The ninth pinion gear 302 is meshed with the eighth pinion gear 301 and is rotated by an angle of +β in a direction parallel to the first axis 130. The fifth conical gear 303 is attached directly on top of the ninth pinion gear 302 and is therefore rotated in the same angle +β and direction. This fifth conical gear 303 is meshed with the sixth conical gear 304, transferring the direction of rotation into a direction parallel to the second axis 120 by the angle −β. The tenth pinion gear 305 is attached directly to the back of the sixth conical gear 304 and is hence rotated together with the sixth conical gear 304 in the same direction by an angle of −β. The eleventh pinion gear 306 which is the last pinion gear of the first gear train 140 is meshed with the tenth pinion gear 305 and is rotated by an angle +β about the second axis 120.

The second axis shaft 186, which is fixed to the eleventh pinion gear 306 on one end and is fixed to the U-shaped mounting bracket 307 on the other end, rotates by the angle of +β. Therefore, the U-shaped bracket 307 is rotated about the second axis 120 by an angle of +β.

When the U-shaped mounting bracket 307 is rotated about the second axis 120 by the angle +β, the seventh pinion gear 209 moves around the sixth pinion gear 208 together with the rotation of the U-shaped mounting bracket 307. As the sixth pinion gear 208 is stationary in this case, the seventh pinion gear 209 meshing with the sixth pinion gear 208 is rotated also by an angle of +β, hence the third gear train 160 is engaged to rotate the platform 200 about the third axis 110. The third conical gear 210 is rotated by an angle +β in a direction parallel to the second axis 120, and rotating the fourth conical gear 211 by an angle of +β about the third axis 110. As a result the shaft 212 is rotated about the third axis 110 by an angle of +β and the platform 200 is rotated by the angle of +β.

If the rotation of the platform 200 about the third axis 110 caused by the rotation of the U-shaped mounting bracket 307 is not desired, and/or it is intended that only the U-shaped mounting bracket 307 is to be rotated, a corresponding compensation rotation is necessary to rotate platform 200 back to its original position.

To rotate the platform 200 back to the original position, the said platform 200 is to be rotated about the third axis 110 by an angle of −β. This is achieved by rotating the middle shaft 102 by an angle of −β about the first axis 130.

The compensation rotation of the middle shaft 102 to compensate the rotation caused by the rotation of the U-shaped mounting bracket 307 can be done at the same time the innermost shaft 103 is rotated for rotating the U-shaped mounting bracket 307. In other words, both the innermost shaft 103 and the middle shaft 102 are rotated by an angle of −β about the first axis 130 simultaneously to rotate the U-shaped mounting bracket 307 only about the second axis 120 by an angle of +β. According to the preferred embodiment of the invention, both the innermost shaft 103 and the middle shaft 102 are rotated together if only rotation of the U-shaped mounting bracket 307 is desired.

To rotate the fiber optics transceiver, which is attached to the platform 200, by an angle of +γ about the first axis 130, the plate 400 needs to be rotated by the angle +γ. The plate 400, according to the preferred embodiment of the invention, is directly attached to the outermost shaft 101 and therefore the rotation of the plate 400 by an angle of +γ about the first axis 130 is achieved by rotating the outermost shaft 101 by the same angle of +γ about the first axis 130.

However, when the plate 400 is rotated, the U-shaped mounting bracket 307 will also be rotated via the first gear train 140. When the plate 400 is rotated by an angle of +γ about the first axis 130, the ninth pinion gear 302 is moved around the eighth pinion gear 301 and is rotated by an angle of +γ in a direction parallel to the first axis 130 as a result. This causes the fifth conical gear 303 to rotate by an angle of +γ in the same direction parallel to the first axis 130, and the sixth conical gear 304 is rotated by an angle of −γ in a direction parallel to the second axis 120. The tenth pinion gear 305 is then rotated together with the sixth conical gear 304 in the same direction parallel to the second axis 120 by an angle of −γ. This results in the eleventh pinion gear 306 being rotated by an angle of +γ about the second axis 120, and hence the second axis shaft 306 is rotated by the same angle of +γ about the second axis 120. Therefore, the U-shaped mounting bracket 307 is rotated about the second axis 120 by an angle of +γ as a result of the rotation of the plate 400 by an angle of +γ about the first axis 130.

Similarly, when plate 400 is rotated, the platform 200 will also be rotated via the second and third gear trains 150, 160. When the plate 400 is rotated by an angle of +γ about the first axis 130, the second pinion gear 202 is moved around the first pinion gear 201 and is rotated by an angle of +γ in a direction parallel to the first axis 130 as a result. This causes the first conical gear 203 to rotate by an angle of +γ in the same direction parallel to the first axis 130, and the second conical gear 204 is rotated by an angle of +γ in a direction parallel to the second axis 120. The third pinion gear 205 is then rotated together with the second conical gear 204 in the same direction parallel to the second axis 120 by an angle of +γ. This results in the fourth pinion gear 206 being rotated by an angle of −γ about a direction parallel to the second axis 120, and hence the fifth pinion gear 207 is rotated by an angle of +γ about the second axis 120. The sixth pinion gear 208 is also rotated by an angle of +γ about the second axis 120, causing the seventh pinion gear 209 to rotate by an angle of −γ in a direction parallel to the second axis 120. The third conical gear 210 is thus rotated in the same direction and angle of the seventh pinion gear 209, resulting the fourth conical gear 211 being rotated about the third axis 110 by an angle of −γ. Therefore, the platform 200 is rotated about the third axis 110 by an angle of −γ as a result of the rotation of the plate 400 by an angle of +γ about the first axis 130.

However, since the rotation of the U-shaped mounting bracket 307 by an angle of +γ about the second axis 120 causes the platform 200 to rotate by an angle of +γ about the third axis 110 via rotation of the gears in the third gear train 160, the rotation of the platform 200 by the angle −γ caused by the rotation of the plate 400 via the second and third gear trains 150, 160 is automatically compensated.

If the rotation of the U-shaped mounting bracket 307 about the second axis 120 caused by the rotation of the plate 400 is not desired, and/or it is intended that only the plate 400 is to be rotated, a corresponding compensation rotation is necessary to rotate the U-shaped mounting bracket 307 back to its original position.

To rotate the U-shaped mounting bracket 307 back to the original position, the said bracket 307 is to be rotated about the second axis 120 by an angle of −γ. This is achieved by rotating the innermost shaft 103 by an angle of +γ about the first axis 130.

However, rotating the U-shaped mounting bracket 307 by rotating the innermost shaft 103 will also cause the third gear train 160 to rotate the platform 200 by the same angle in the third axis 110. In other words, when the U-shaped mounting bracket 307 is rotated by an angle of −γ about the second axis 120 to compensate the rotation caused by the plate 400, platform 200 is also rotated by an angle of −γ about the third axis 110. Therefore, the platform 200 needs to be rotated back to its original position if the said rotation of the platform 200 is not desired.

To rotate the platform 200 back to the original position, the said platform 200 is to be rotated about the third axis 110 by an angle of +γ. This is achieved by rotating the middle shaft 102 by an angle of +γ about the first axis 130.

In other words, both the middle shaft 102 and the innermost shaft 103 need to be rotated to compensate the rotation caused by the plate 400.

The rotation of the middle shaft 102 and the innermost shaft 103 to compensate the rotation caused by the rotation of the U-shaped mounting bracket 307 and the plate 400, respectively, can be done at the same time the outermost shaft 101 is rotated for rotating the plate 400. In other words, the innermost shaft 103, the middle shaft 102 and the outermost shaft 101 are rotated by an angle of +γ about the first axis 130 simultaneously to rotate the plate 400 only about the first axis 130 by an angle of +γ. According to the preferred embodiment of the invention, the innermost shaft 103, the middle shaft 102 and the outermost shaft 101 are rotated together if only rotation of the plate 400 is desired.

The operation of the pinion gear type device according to the preferred embodiment of the invention is described with the gear ratio of the first, second and third pinion gear trains 140, 150, 160 used being equal. However according to another embodiment of the invention, the gear ratio of the first, second and third pinion gear trains 140, 150, 160 used are not equal.

According to the preferred embodiment of the invention, the innermost shaft 103, the middle shaft 102 and the outermost shaft 101 are connected to a servomotor via corresponding sprockets and chains installed in a distance from the plate 400 along the first axis. The servomotor is controlled by a computer device and the rotations of the said shafts 101, 102, 103 and hence the rotation of the platform 200, U-shaped mounting bracket 307 and the plate 400 and hence the fiber optics transceiver, attached to the center of the platform 200, are automated and controlled accurately.

The described embodiments of the invention may also apply to a computer containing a program element for controlling the motor drivers, in particular, a servomotor, connected to the pinion gear type device.

What is claimed is:

1. A pinion gear type rotating device for rotating a member about first, second and third axes, the second axis extending across the first axis and the third axis extending across the second axis, comprising: a first support structure which is rotatable about the first axis, a first shaft which extends along the first axis and to which a second support structure is connected via a first pinion gear train for rotating the second support structure about the second axis, the second support structure and the first pinion gear train being arranged on the first support structure for being rotated therewith, and a second shaft which extends along the first axis and to which a third support structure for holding the member is connected via second and third pinion gear trains for rotating the third support structure about the third axis, the third support structure and the third pinion gear train being arranged on the second support structure for being rotated therewith, and the second pinion gear train being arranged on the first support structure for being rotated therewith, wherein the second pinion gear train is provided for transferring the rotation direction about the first axis to a rotation direction about the second axis and the third pinion gear train being provided for transferring rotation direction about the second axis to a rotation direction about the third axis.

2. The device according to claim 1, further comprising a third shaft which extends along the first axis and which is connected to the first support structure for rotating the same.

3. The device according to claim 1, wherein the first, second and third pinion gear trains each comprise a set of two conical gears.

4. The device according to claim 1, wherein the first support structure comprises a platform.

5. The device according to claim 4, wherein the platform comprises a plate.

6. The device according to claim 1, wherein the second support structure comprises an U-shaped mounting bracket.

7. The device according to claim 1, wherein the third support structure comprises a platform.

8. The device according to claim 7, wherein the platform comprises a plate.

9. The device according to claim 1, wherein the gear ratios of the first, second and third pinion gear trains are equal.

10. A device for determining electromagnetic interference of a fiber optics transceiver, comprising an electromagnetic test chamber and a pinion gear type rotating device according to claim 2, the pinion gear type rotation device being arranged within the electromagnetic test chamber with the shafts extending outside of the chamber through an opening in the chamber for being connected to corresponding motor drives for separately driving the said shafts.

11. A method for operating a pinion gear type rotating device according to claim 1, comprising: if it is desired to rotate the third support structure by an angle α about the first axis only, rotating the first support structure by the angle of +α or −α, rotating the first shaft by an angle of +β or −β, respectively, in order to compensate rotation of the second support structure resulting from rotation of the first support structure, and rotating the second shaft by an angle of +γ or −γ, respectively, in order to compensate the rotation of the third support structure resulting from rotation of the first shaft, thereby rotating the third support structure by the angle a about the first axis only; if it is desired to rotate the third support structure by an angle β about the second axis only, rotating the first shaft by the angle of +β or −β, and rotating the second shaft by an angle of +γ or −γ, respectively, in order to compensate rotation of the third support structure resulting from the rotation of the second support structure, thereby rotating the third support structure by the angle β about the second axis only; and if it is desired to rotate the third support structure by an angle γ about the third axis only, rotating the second shaft by the angle of +γ or −γ, thereby rotating the third support structure by the angle γ about the third axis only.

12. A method for operating a pinion gear type rotating device according to claim 9, comprising: if it is desired to rotate the third support structure by an angle α about the first axis only, rotating the first support structure by the angle of +α or −α, rotating the first shaft by an angle of +α or −α, respectively, in order to compensate rotation of the second support structure resulting from rotation of the first support structure, and rotating the second shaft by the angle of +α or −α, respectively, in order to compensate the rotation of the third support structure resulting from rotation of the first shaft, thereby rotating the third support structure by the angle α about the first axis only; if it is desired to rotate the third support structure by an angle β about the first axis only, rotating the first shaft by the angle of +β or −β, and rotating the third shaft by an angle of +β or −β, respectively, in order to compensate rotation of the third support structure resulting from the rotation of the second support structure, thereby rotating the third support structure by the angle β about the second axis only; and if it is desired to rotate the third support structure by an angle γ about the third axis only, rotating the second shaft by the angle of +γ or −γ, thereby rotating the third support structure by the angle γ about the third axis only.

* * * * *